United States Patent
Watanabe

(10) Patent No.: US 8,174,954 B2
(45) Date of Patent: May 8, 2012

(54) OPTICAL INFORMATION RECORDING AND REPRODUCING METHOD AND OPTICAL INFORMATION RECORDING AND REPRODUCING APPARATUS

(75) Inventor: Koichi Watanabe, Hachioji (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/826,775

(22) Filed: Jun. 30, 2010

(65) Prior Publication Data

US 2011/0002214 A1    Jan. 6, 2011

(30) Foreign Application Priority Data

Jul. 3, 2009    (JP) .................................. 2009-159175

(51) Int. Cl.
*G11B 7/00* (2006.01)
(52) U.S. Cl. ........................................ 369/116; 369/121
(58) Field of Classification Search .................. 369/116, 369/47.53, 47.5, 120, 121, 53.13, 47.1, 122, 369/59.11, 59.12, 47.51
See application file for complete search history.

(56) References Cited

U.S. PATENT DOCUMENTS

| | | | | |
|---|---|---|---|---|
| 4,713,672 A * | 12/1987 | Horihata et al. | ............... | 347/246 |
| 6,011,768 A * | 1/2000 | Taguchi | ........................ | 369/116 |
| 6,534,794 B1 | 3/2003 | Nakanishi et al. | | |
| 6,671,232 B1 * | 12/2003 | Stupp | ........................ | 369/13.02 |
| 7,099,251 B2 * | 8/2006 | Naoi et al. | ................... | 369/53.13 |
| 7,283,445 B2 * | 10/2007 | Yamashita | ................... | 369/47.5 |
| 2005/0128925 A1 * | 6/2005 | Yamashita | ................. | 369/124.1 |
| 2007/0291802 A1 | 12/2007 | Nishimura et al. | | |
| 2009/0052306 A1 * | 2/2009 | Ikeda et al. | ................... | 369/116 |

FOREIGN PATENT DOCUMENTS

| | | |
|---|---|---|
| JP | 2002-329320 | 11/2002 |
| JP | 2007-334972 | 12/2007 |

* cited by examiner

*Primary Examiner* — Nabil Hindi
(74) *Attorney, Agent, or Firm* — Antonelli, Terry, Stout & Kraus, LLP.

(57) ABSTRACT

An optical information recording and reproducing method for recording or reproducing information by irradiating pulsed laser diode light from a laser diode (LD) light source in which the resistance value of the LD light source is measured in an operating state, the measured LD light source resistance value is compared with a target resistance value, and the LD light source is heated when the LD light source resistance value is higher than the target resistance value, in order to maintain the LD light source resistance at a specified value or less.

17 Claims, 17 Drawing Sheets

FLUCTUATIONS IN I-V CHARACTERISTIC
OF LD DUE TO TEMPERATURE

FLUCTUATIONS IN I-L CHARACTERISTIC
OF LD DUE TO TEMPERATURE

| | | LD RESISTANCE VALUE (Ω) |
|---|---|---|
| LASER POWER | LOW | R1 |
| | MEDIUM | R2 |
| | HIGH | R3 |

| | | LD TARGET TEMPERATURE (°C) |
|---|---|---|
| LASER POWER | LOW | A1 |
| | MEDIUM | A2 |
| | HIGH | A3 |

OPTIMAL TEMPERATURE
RANGE FROM
HIGH-FREQUENCY
CHARACTERISTICS

FIG. 21

| | | LD RESISTANCE VALUE (Ω) |
|---|---|---|
| LASER POWER | LOW | $R1 \leq Rt \leq R2$ |
| | MEDIUM | $R3 \leq Rt \leq R4$ |
| | HIGH | $R5 \leq Rt \leq R6$ |

OPTICAL INFORMATION RECORDING AND REPRODUCING METHOD AND OPTICAL INFORMATION RECORDING AND REPRODUCING APPARATUS

CLAIM OF PRIORITY

The present application claims priority from Japanese patent application JP 2009-159175 filed on Jul. 3, 2009, the content of which is hereby incorporated by reference into this application.

FIELD OF THE INVENTION

The present invention relates to an optical information recording and reproducing method and optical information recording and reproducing apparatus for recording and reproducing information on an optical information recording medium by driving and by regulating the optical modulation waveform.

BACKGROUND OF THE INVENTION

Advances in making large-capacity optical disk devices have led to products up to now including compact disks (CD) utilizing infrared LD (wavelength 780 nm), DVD utilizing red LD (wavelength 650 nm), and Blu-ray discs (BD) utilizing blue LD (405 nm).

The write strategy technology in the BD-RE (Rewritable) for example utilizes multiple LD pulses possessing up to three types of power levels as shown in FIG. 2. These three types of power levels in order of high power are write power (Pw), erase power (Pe), and bottom power (Pb). Irradiating the write power (Pw) LD light onto the optical disk melts the recording film on the optical disk. After quickly cooling, the optical disk then reaches an amorphous state (non-crystallized state) where the light reflectance is low. This section of film is utilized as the recording mark. Moreover, irradiating the erase power (Pe) LD light onto the optical disk forms a crystallized state on the optical disk recording film. The section of the optical disk that was a non-crystallized state before irradiating the LD light reaches a crystallized state, and the section of the disk that was originally crystallized, remains in that state. The recording mark is erased in this way.

The write strategy includes rectangular mono-pulses utilized in CD-R, DVD-R, comb-like multi-pulses utilized in CD-RW, DVD-RW, DVD-RAM (See FIG. 2), and castle-shaped (non-multi) pulses utilized in high-speed recording of DVD optical disks (See FIG. 3).

As shown in FIG. 2 and FIG. 3, the values that determine the recording waveform edge timing, and values that determine recording power such as the write power Pw, gap power Pg, erase power Pe are called the recording parameters. Optimum values for these recording parameters are determined beforehand and prerecorded into each recording medium. In the BD-RE (rewritable Blu-ray disk) for example, the optimal recording parameter values are written into the DI information within the Permanent Information and Control data formed on the lead in zone on the inner circumference of the disk. Optimal values for recording parameter groups differ according to the composition and material used in the recording medium.

Namely, during recording of the recording marks, the recording parameters such as values for determining the recording waveform edge timing, values for determining recording powers such as Pw and Pg, and values for each shift table are loaded from the recording medium and an ideal recording mark is then formed by utilizing these loaded recording parameters to regulate the LD pulse.

A poorly formed recording mark might make correctly reproducing the recorded data impossible so the recording mark must be correctly formed. In order to form a satisfactory recording mark, the LD emits pulsed light to control the heat accumulating from light emitted onto the recording film of the optical disk. Electrical current is usually provided in a pulsed state to the semiconductor laser diode (hereafter called LD) that emits the LD light.

The LD driver (LDD) is a device for providing electrical current in a pulsed state to the LD. Providing electrical current in a pulsed state to the LD, by way of the LD driver allows the LD to generate a light emission pattern based on the pulse timing of the supplied electrical current, and in this way form a satisfactory recording mark.

The recording speed onto the optical disk tends to become faster every year. Next generation BD (Blu-ray disks) will also provide even better performance because of their multiple layers. Both of these factors involve even higher LD power.

The increased LD power is achieved by boosting the electrical current the LD driver supplies to the LD. The increase in electrical current that the LD driver supplies to the LD causes the LD driver (especially the LD drive unit) to consume more electrical current. A large change in the resistance value due in particular to the temperature is known to occur in the blue LD utilized in BD (blu-ray disks). FIG. 4 shows an equivalent LD circuit. This LD possesses a direct current resistive component R (hereafter called LD resistance) as shown in FIG. 4. During low temperatures the LD resistance tends to increase and also tends to decrease as the temperature rises as shown in FIG. 5. The relation between the LD drive current and the LD drive voltage (Hereafter called "LD-IV characteristic") generated at both ends of the LD is as shown in FIG. 6. In other words, the LD-IV characteristic drops as the temperature rises. Maintaining the same LD drive current therefore requires lowering the LD drive voltage when the temperature becomes high. To lower the LD drive voltage, the technology described in JP-A 2007-334972 (=US2007/0291802) contains a pre-stored voltage value to supply to the laser driver when a specified temperature is reached, and attains low power consumption by regulating the voltage supplied to the power supply based on this stored voltage value.

SUMMARY OF THE INVENTION

The technology disclosed in JP-A 2007-334972 regulates the voltage to sufficiently match voltage fluctuations in the LD driver due to effects from temperature.

This method requires a large drive voltage when the LD is at a low temperature. Moreover, a study made by the present inventors confirmed that the differential resistance of the LD fluctuates along with light emission power from the LD (see FIG. 5). Variations are moreover predicted to occur to a certain extent in the resistance of mass-produced LD in semiconductor LD light emission devices that contain the above described LD and LD driver.

In view of the above circumstances, the present invention has the object of providing an optical information recording and reproducing method and optical information recording and reproducing apparatus capable of stable recording and reproducing with low power consumption regardless of fluctuations caused by large effects such as from LD and LD driver temperature characteristics and recording power.

The present invention utilizes the LD temperature characteristics as shown in FIG. 5 to achieve low power consumption by optimizing the LD characteristics. To optimize LD characteristics, the present invention regulates the LD temperature by making adjustments to change the temperature until the resistance R of the LD is within a specified resistance value.

FIG. 7 shows a view of the LD and LDD periphery for describing the present invention. Here, LD1 is connected to a voltage supply 3 and is driven by LDD2. Setting the measured voltage to Vd at test point 4 which is the connection between LD1 and LDD2 (where R denotes the LD resistance and Iop denotes the drive current) allows lowering the LD resistance R by raising the LD temperature when Iop and Vd are a specified value relative to the power supply voltage $Vs=Iop \times R+Vd$. The power supply voltage Vs consequently drops to a low figure and applying the power consumption calculation allows suppressing the power consumption $W=Iop \times Vs$ to a low figure. Moreover, taking the power consumption of the laser itself into account yields the power consumption $W=Iop^2 \times R$, and the smaller the R, the lower the power consumption.

The resistance R of the LD is usually found by $R=V/I$ where V is the voltage applied to the LD and I is the current flow. However, the LD resistance R is power dependent as shown in FIG. 5 so higher accuracy can be obtained by finding the R for power usage from the I-V characteristic rather than from the relation between voltage and current (V and I) at a specified point.

The control method of the present invention can generally be considered as the following two methods.

One method varies the temperature to make the LD emit light, measures the I-V characteristic, finds the LD resistance value from the slope of the I-V characteristics, and then begins recording after heating the LD until the LD resistance value reaches the specified value or less.

Another method utilizes a temperature and I-V characteristic pre-stored in the table (FIG. 16), and a temperature sensor mounted in the LD (See FIG. 15) to measure the LD temperature, and begins recording after heating the LD until the temperature reaches the specified value or less.

An optical information recording and reproducing method of the present invention for irradiating pulsed LD light from a LD light source onto an optical information recording medium to record or reproduce information includes: a process to acquire information relating to the resistance value of the LD light source in an operating state, and a process to compare the acquired LD light source resistance value with the target resistance value, and a process to set the LD light source resistance to a specified value or less by heating the LD light source when comparison reveals the LD light source resistance value is higher than the target resistance value. The process for acquiring the LD light source resistance value may measure the LD voltage while changing the LD drive current, and acquire the resistance value from the slope of the voltage-current characteristics.

Also, an optical information recording and reproducing method of the present invention for irradiating pulsed LD light from a LD light source onto an optical information recording medium to record or reproduce information includes: a process to measure the temperature of the LD light source in a state where the LD output power was set, a process to acquire the target temperature based on the table showing target temperatures corresponding to the LD output, a process to compare the target temperature and the measured temperature of the measured LD light source, and a process to set the LD light source resistance to a specified value or less by heating the LD light source when comparison reveals the LD light source temperature is lower than the target temperature. The process for measuring the temperature of the LD light source may utilize a temperature sensor to measure the temperature of the LD light source.

Still further, an optical information recording and reproducing method of the present invention for irradiating pulsed LD light from a LD light source onto an optical information recording medium to record or reproduce information includes: a process to acquire information relating to the resistance value of the LD light source in an operating state, a process to acquire the target resistance value range based on a table showing the target resistance value range corresponding to the LD output, a process to compare the acquired resistance value of the LD light source with the target resistance value range, and a process to optimize the high-frequency (RF) characteristics of the LD light source and also set the LD light source resistance to a specified value or less by heating the LD light source when the LD light source resistance value is higher than the target resistance value range in the comparison step, and to cool the LD light source when the LD light source resistance value is lower than the target resistance value range in the comparison step. The process for acquiring the LD light source resistance value may measure the LD voltage while changing the LD drive current, and acquire the resistance value from the slope of the voltage-current characteristics.

An optical information recording and reproducing apparatus of the present invention for irradiating pulsed LD light from a LD light source onto an optical information recording medium to record or reproduce information includes: a LD resistance value acquisition unit to acquire information relating to the resistance values of the LD light source in an operating state, a table to store the target resistance values of the LD, a resistance value comparator unit to compare the LD light source resistance value acquired by the LD resistance value acquisition unit with the target resistance value in the table, and a temperature regulator mechanism to heat the LD light source in order to set the resistance of the LD light source to a specified value or less when the comparison reveals that the resistance value of the LD light source is higher than the target resistance value. The LD resistance value acquisition unit may measure the LD voltage while changing the LD drive current, and acquire the resistance value from the slope of the voltage-current characteristics.

An optical information recording and reproducing apparatus of the present invention for irradiating pulsed LD light from a LD light source onto an optical information recording medium to record or reproduce information includes: a LD temperature measurement unit to measure the temperature of the LD light source in a state where the LD output power is already set, a table showing target temperatures corresponding to the LD output, a temperature comparator unit to compare the LD light source temperature measured by the LD temperature measurement unit with the target temperature acquired from the table, and a temperature regulator mechanism to set the resistance of the LD light source to a specified value or less by heating the LD light source when the comparison reveals that the temperature of the LD light source is lower than the target temperature. The LD temperature measurement unit may include a temperature sensor for the LD light source. The temperature regulator mechanism may include an electrical heating element within the LD light source, or may include an electrical heating element outside the LD light source, to heat the LD light source.

An optical information recording and reproducing apparatus of the present invention for irradiating pulsed LD light from a LD light source onto an optical information recording medium to record or reproduce information includes: a LD resistance value acquisition unit to acquire information relating to the resistance values of the LD light source in an operating state, a table to store the target resistance values of the LD, a resistance value comparator unit to compare the LD light source resistance value acquired by the LD resistance value acquisition unit with the target resistance value in the table, a temperature regulator mechanism to optimize the high-frequency (RF) characteristics of the LD light source and also set the LD light source resistance to a specified value or less by heating the LD light source when the LD light source resistance value is higher than the target resistance value range in the comparison step, and to cool the LD light source when the LD light source resistance value is lower than the target resistance value range in the comparison step. The LD resistance value acquisition unit may measure the LD voltage while changing the LD drive current, and acquire the resistance value from the slope of the voltage-current characteristics.

Incidentally, in terms of heating the LD, the technology disclosed in JP-A 2001-111165 (=U.S. Pat. No. 6,534,794) is known to contain a heater unit for heating the semiconductor laser diode in order to suppress the non-linear response called kinks (See FIG. 8) in the low temperature I-L characteristics of the semiconductor light emitting element. Moreover, the technology in JP-A 2002-329320 discloses that the recording starts after the temperature of the LD itself reaches a specified value by preheating the LD itself in order to avoid changes in the LD wavelength or changes in the slope of the I-L characteristics due to temperature. However these techniques are different from the present invention that lowers the power consumption by taking into account changes in LD resistance due to temperature.

The present invention achieves low power consumption when the LD drive current is large due to high-speed and multi-laminating, and does not require a large power supply voltage even during low temperatures.

BRIEF DESCRIPTION OF THE DRAWINGS

FIG. 21 is a drawing showing the control table for setting the resistance range in the third embodiment.

DETAILED DESCRIPTION OF THE PREFERRED EMBODIMENTS

Figure 2:
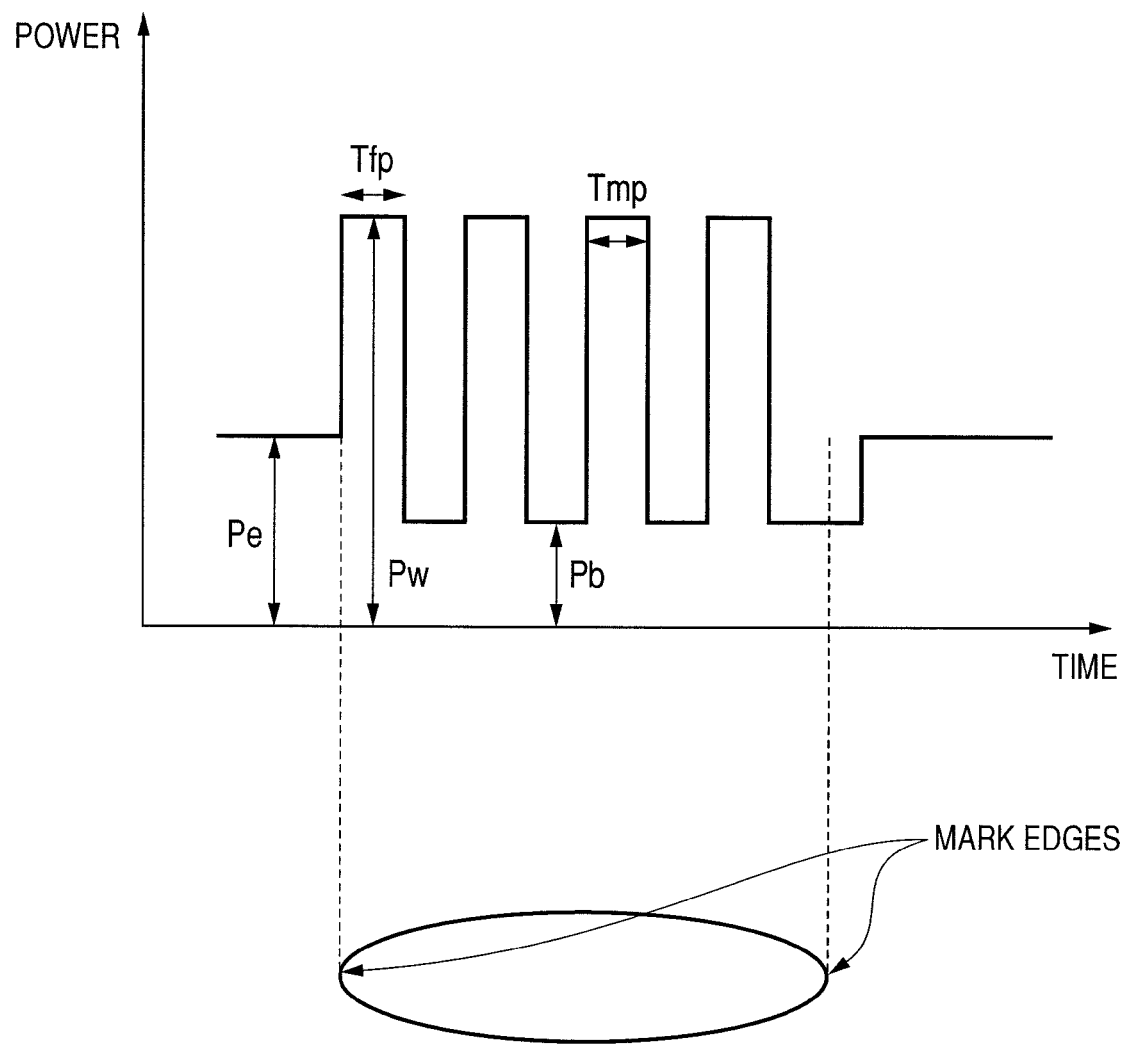
FIG. 2 is a graph and drawing for showing one example of the multi pulse write strategy and describing the recording marks formed by this strategy.
Figure 3:
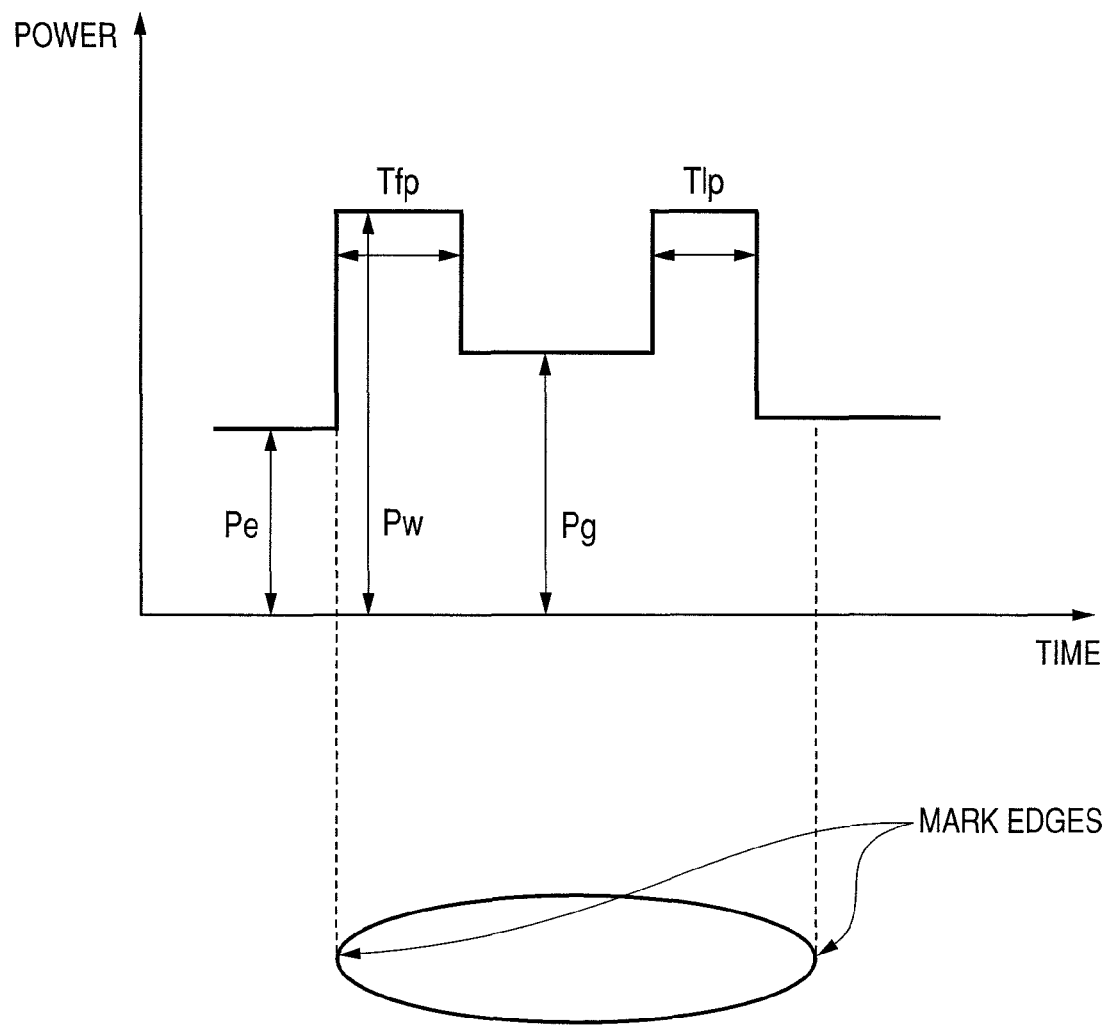
FIG. 3 is a graph and drawing for showing one example of the non-multi pulse write strategy and describing the recording marks formed by this strategy.
Figure 4:
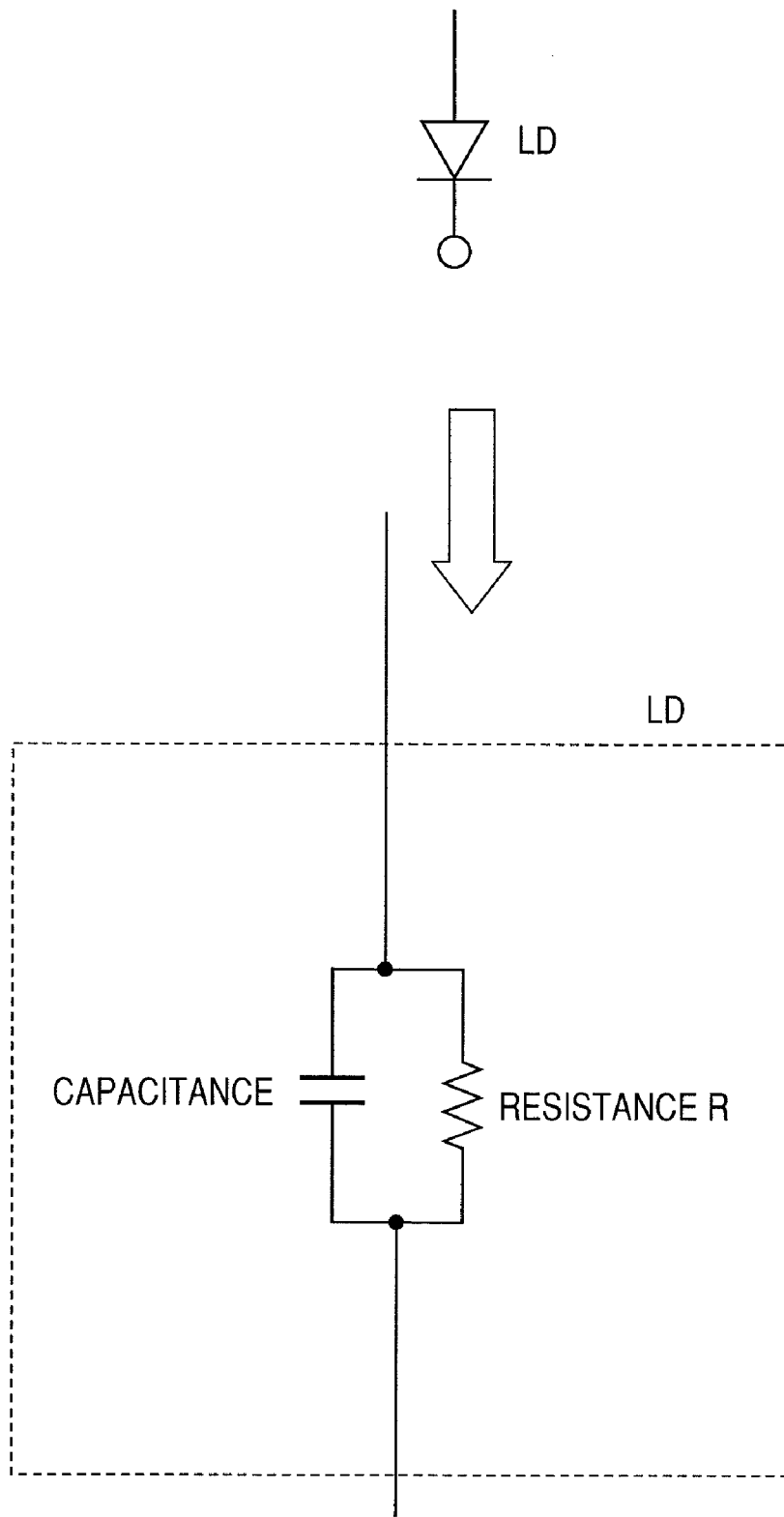
FIG. 4 is a drawing showing the LD equivalent circuit.
Figure 5:
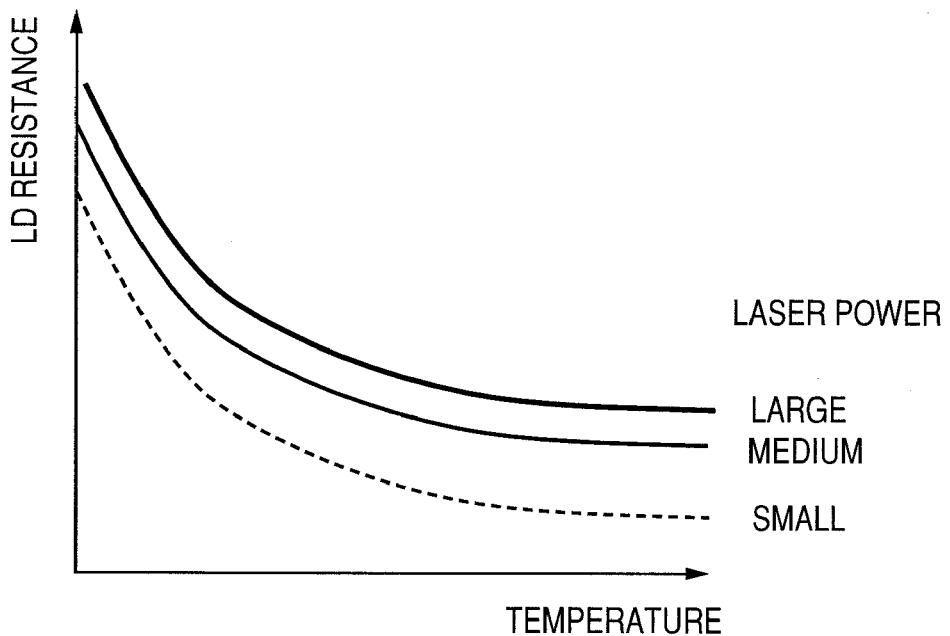
FIG. 5 is a graph showing the temperature dependence of the LD differential resistance, and LD power dependence.
Figure 6:
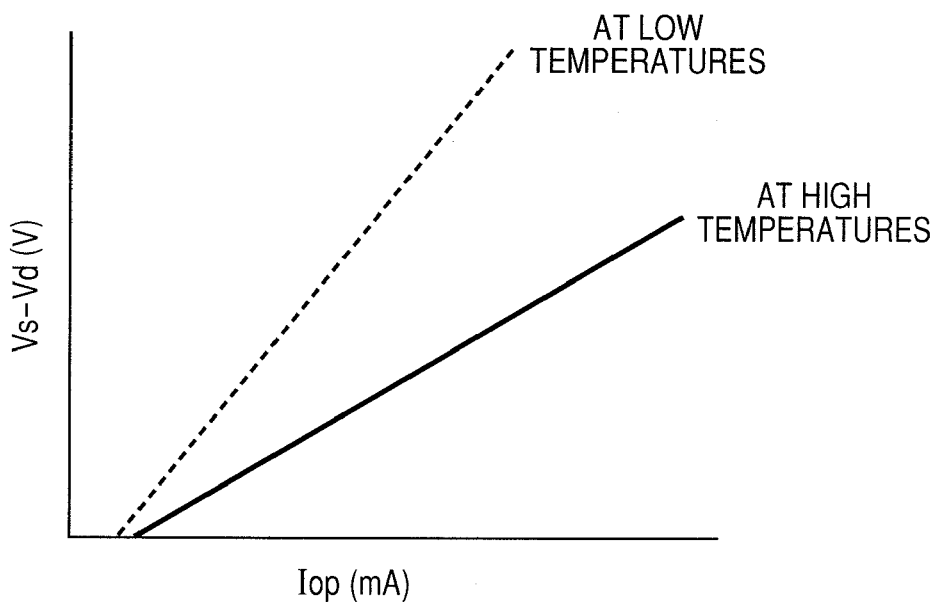
FIG. 6 is a graph showing temperature fluctuations in the I-V characteristics of the LD.
Figure 9:
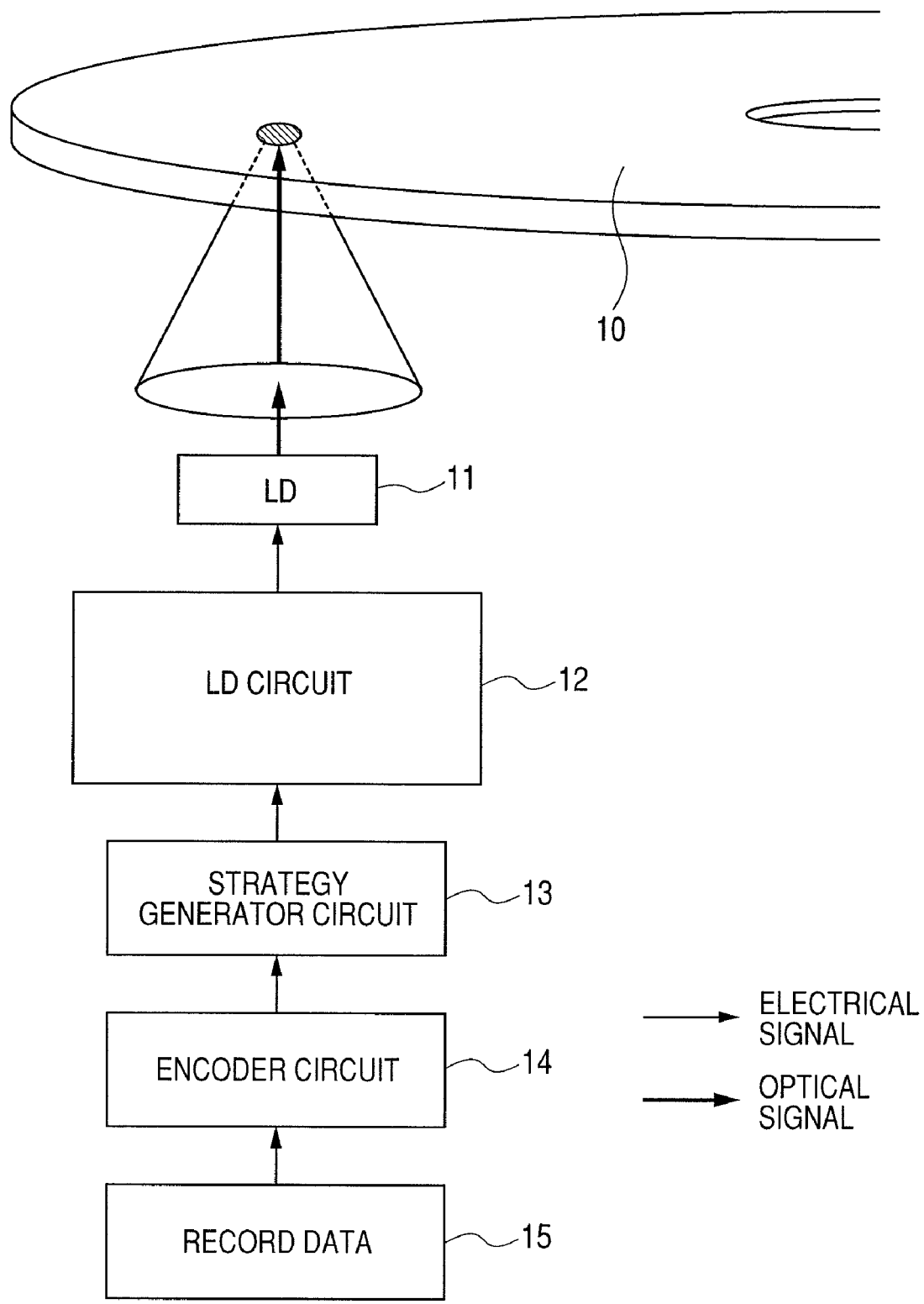
FIG. 9 is a concept view showing the flow up to writing the recording signal onto the optical disk.

The embodiments of the present invention are described next while referring to the drawings.
First Embodiment FIG. 9 is a concept view showing the flow sequence up to writing the recording signal 15 onto the optical disk 10. The LD driver in this invention merely contains a function for receiving commands from the register and outputting electrical current. However in addition to that function the LD driver as shown in FIG. 9 may also include a strategy generator circuit. An encoder circuit 14 encodes the input data 15. A strategy generator circuit 13 then converts that encoded signal to signals for forming a strategy to write onto the disk. The strategy generator circuit in FIG. 9 therefore also contains a power resistor. The signal from the strategy generator circuit is input to the LD driver 12. FIG. 2 is a graph showing the relation between the drive current pulse generated from the LD driver, and the light emission pulses output from the LD. The current waveform from the LD driver is sent to the LD diode 11 as shown in FIG. 2 and formed into a LD light emission waveform.

Figure 10:
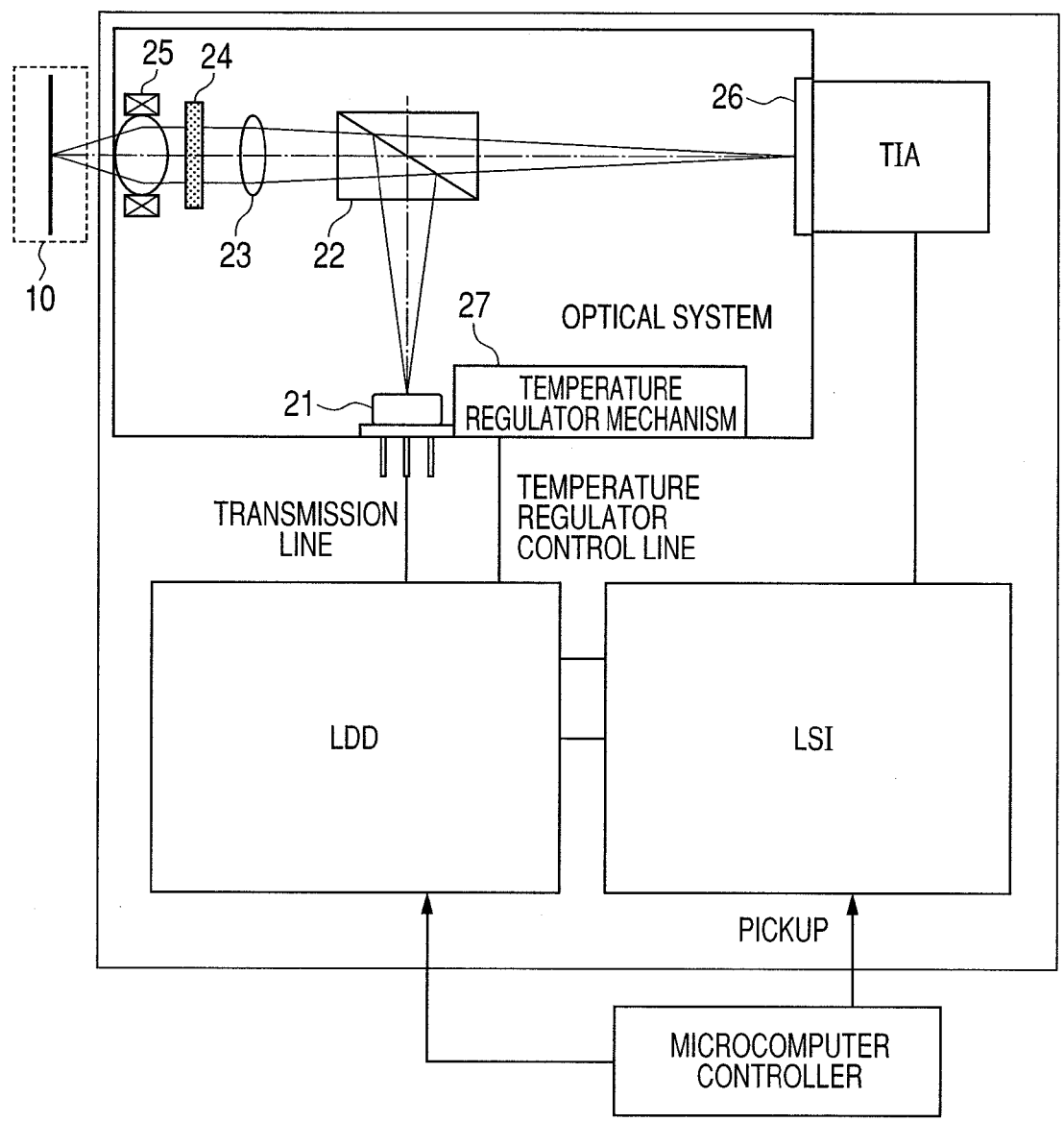
FIG. 10 is a drawing showing one example of the optical pickup.

FIG. 10 shows one example of the optical pickup, and shows the recording or reproducing state on the optical disk.

The LD21 emits an S polarized light ray that reflects perpendicularly from the optical disk 10 relative to the input direction from the PBS (polarization beam splitter) 22, and is then converted into collimated parallel light by the collimating lens 23. The quarter wavelength plate 24 then converts the input light from linear polarized light to circular polarized light that is focused by the objective lens 25 and irradiated onto the optical disk 10. The objective lens 25 again converts the reflected light from the optical disk 10 into parallel light. The collimator lens 23 converts that parallel light into focused light. The reflected P polarized light transmits through the PBS22, and irradiates onto the photo detector 26. A temperature regulator mechanism 27 is mounted at LD21 serving as the input port for this optical system and implements the invention by the following procedure. A heater mechanism is utilized as the temperature regulator mechanism 27 in this embodiment and the LD light source may contain an internal electrical heating element serving as the heater mechanism or may utilize an electrical heating element outside the LD light source. A resistor that heats up due to internal electrical current flow may be installed within the LD as the electrical heating element within the LD light source.

Figure 11:
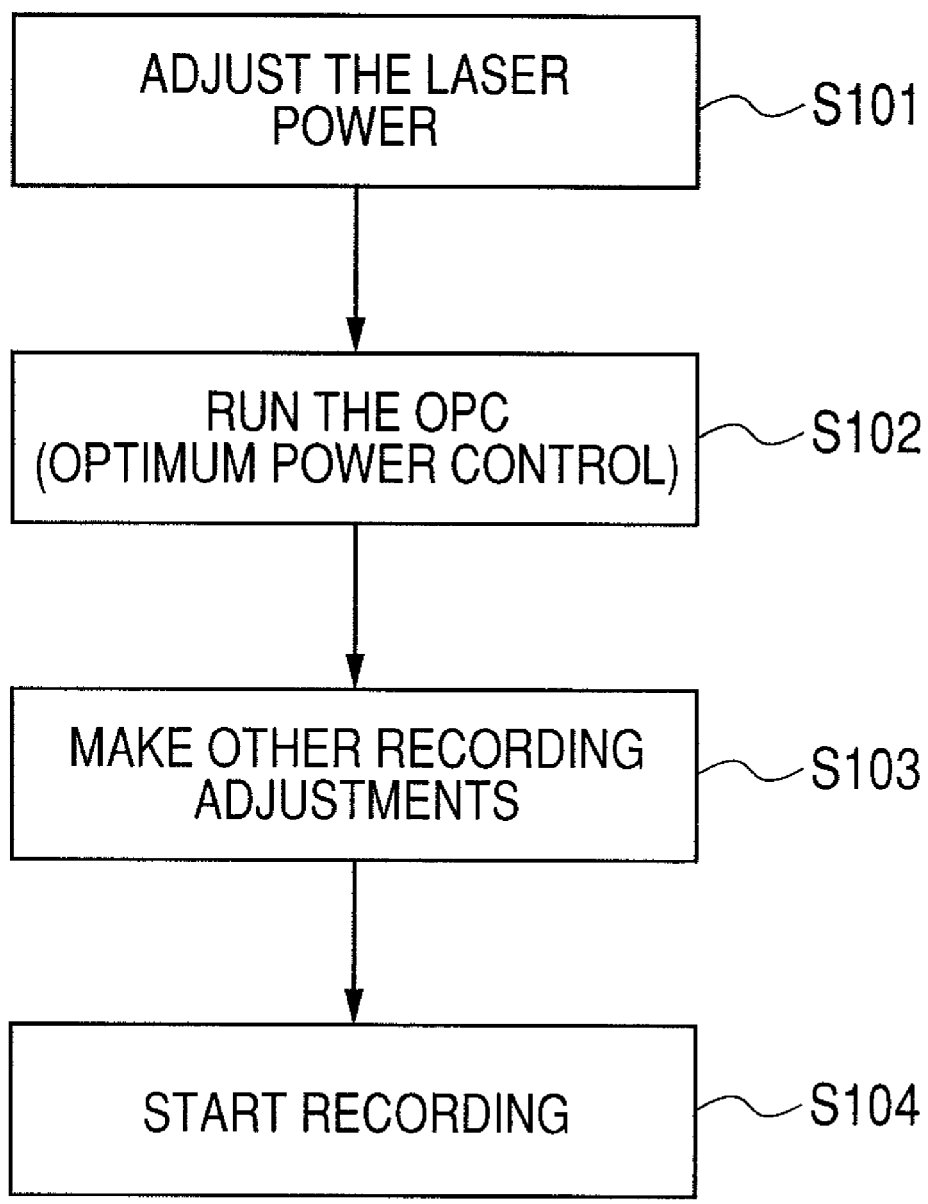
FIG. 11 is a flow chart showing the flow during recording in the related art.

FIG. 11 shows the recording flow sequence during conventional recording. The relation between the LD driver output current and the LD emission light is acquired by adjusting the LD power in the preliminary step (S101). The recording power (OPC/optimum power control) on the disk is then adjusted (S102), and after making other adjustments such as strategy adjustments (S103) the recording starts (S104).

Figure 1:
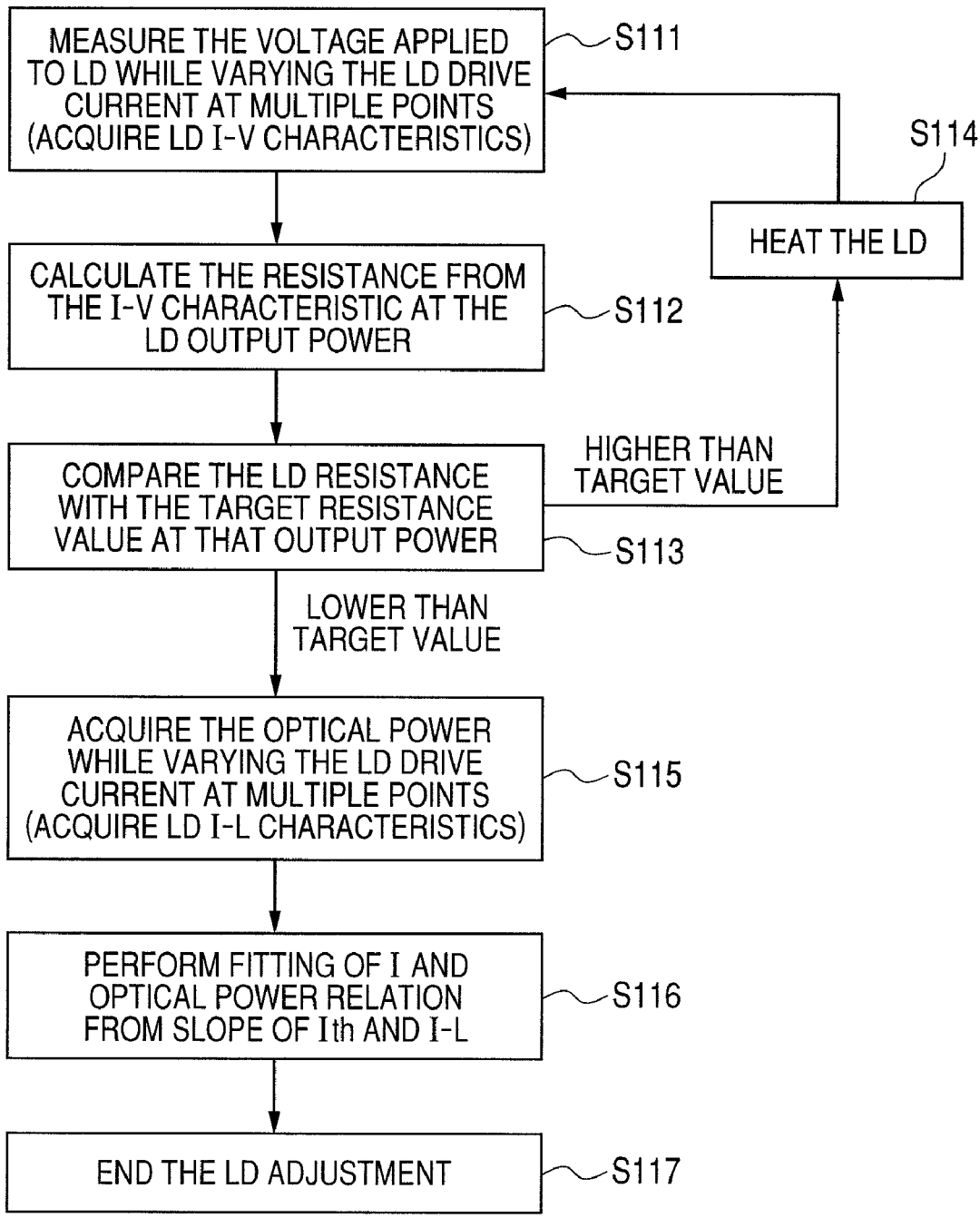
FIG. 1 is a flow sequence chart showing the LD adjustment in a first embodiment of the present invention.
Figures 12, 13:
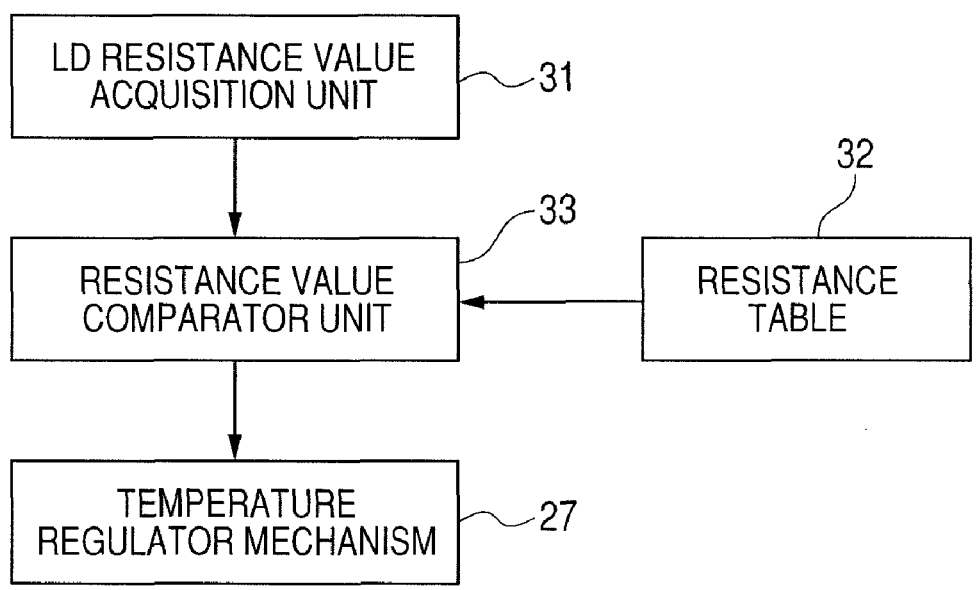
FIG. 12 is a drawing showing the control table for resistance in the first embodiment.
FIG. 13 is a block diagram for implementing the LD adjustment flow of the first embodiment.

This embodiment adds a new flow sequence prior to this LD power adjustment. In the present embodiment, a table as shown in FIG. 12 is made beforehand for target resistance values for LD resistance that match the laser power. The first embodiment is described utilizing the LD adjustment flow sequence shown in FIG. 1.

This embodiment acquires the LD I-V characteristics in step S111 by measuring the voltage applied to the LD while changing the drive current at multiple points.

In step S112 the LD resistance at that LD output power is calculated from the I-V characteristics.

In step S113, the calculated LD resistance is compared with the target resistance value at the LD output acquired from the table in FIG. 12.

If the LD resistance value is within the target value then the embodiment proceeds to acquire the LD I-L characteristics in step S115.

If the LD resistance value is higher than the target value, then the temperature regulator mechanism 27 as shown in FIG. 10 applies control in step S114 by heating the LD.

The embodiment repeats the steps S111 through S114 until the LD resistance value reaches the target value or less. After reaching the target value or less, the I-L characteristics are acquired in step S115, fitting performing in step S116, and the LD adjustment ends (step S117).

The conventional flow sequence for LD power adjustment in FIG. 11 ends in this way, and recording then starts after then making the usual OPC and other recording adjustments.

FIG. 13 is a block diagram of the device structure for implementing this flow sequence. The LD resistance value acquisition unit 31 acquires information relating to the LD light source while in the operating state. A resistance table 32 stores LD target resistance values corresponding to the LD power in the operating state as shown in FIG. 12. A resistance value comparator unit 33 compares the resistance value of the LD light source acquired by the LD resistance value acquisition unit 31 with the target resistance values in the table 32. The temperature regulator mechanism 27 is then operated to heat the LD light source if the comparison made by the resistance value comparator unit 33 shows the LD light source resistance value is higher than the target resistance value, and sets the LD light source resistance within a specified resistance value.

The above embodiment described operation during recording; however, the same operation can obviously be employed during reproducing which uses little laser output power.

Second Embodiment

The first embodiment measures the LD resistance and sets the LD resistance value within a specified value. In the second embodiment however, if the resistance of the LD cannot be measured then the second embodiment measures the temperature of the LD itself and heats the LD to set the LD resistance value within a specified value.

Figure 7:
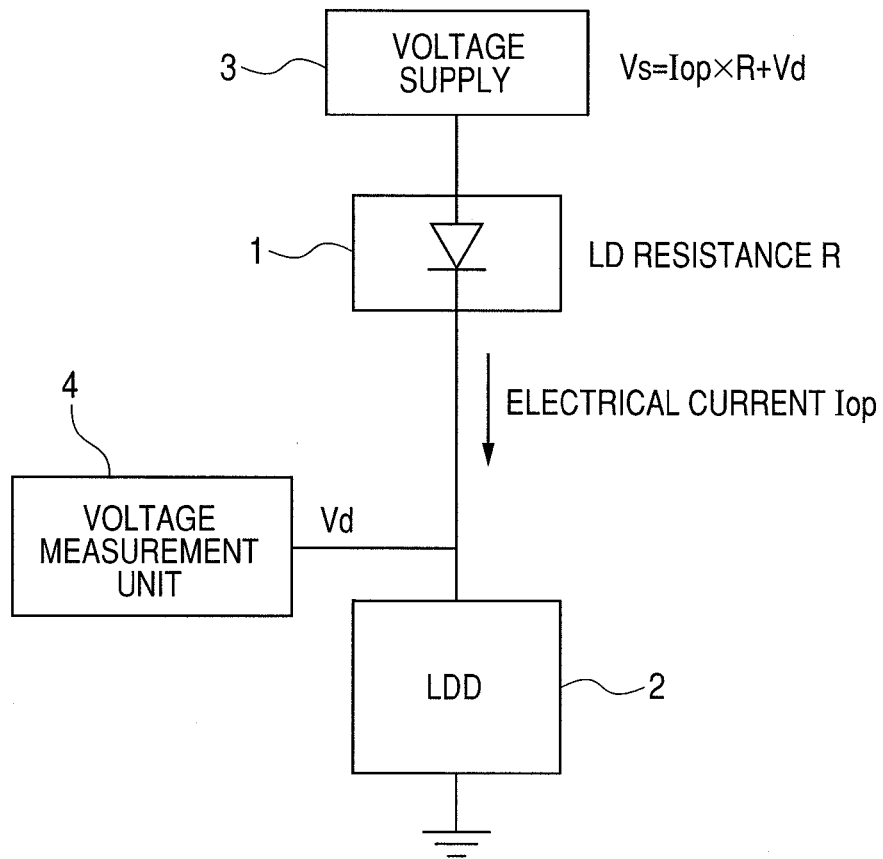
FIG. 7 is a peripheral diagram of the LD-LDD for describing the first embodiment.
Figure 8:
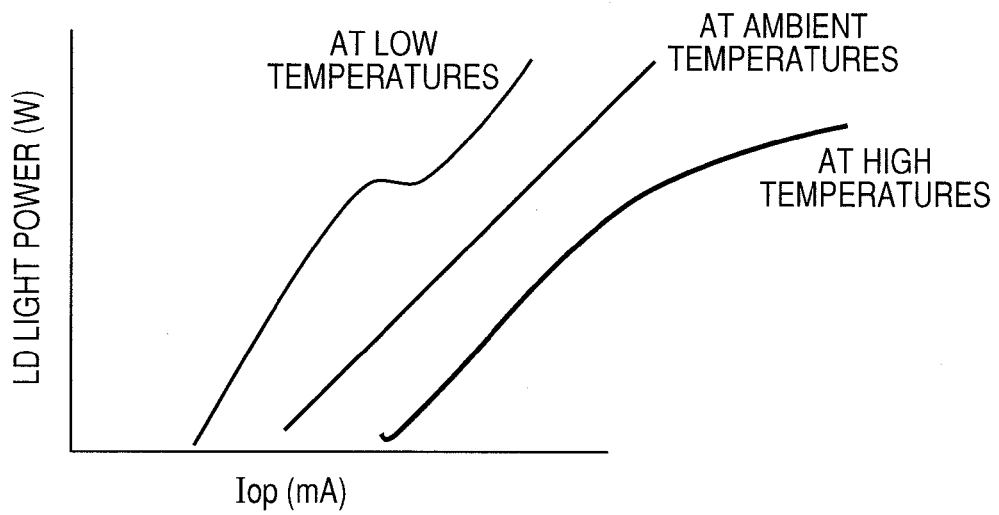
FIG. 8 is a graph for showing temperature fluctuations in the I-L characteristics of the LD.
Figure 14:
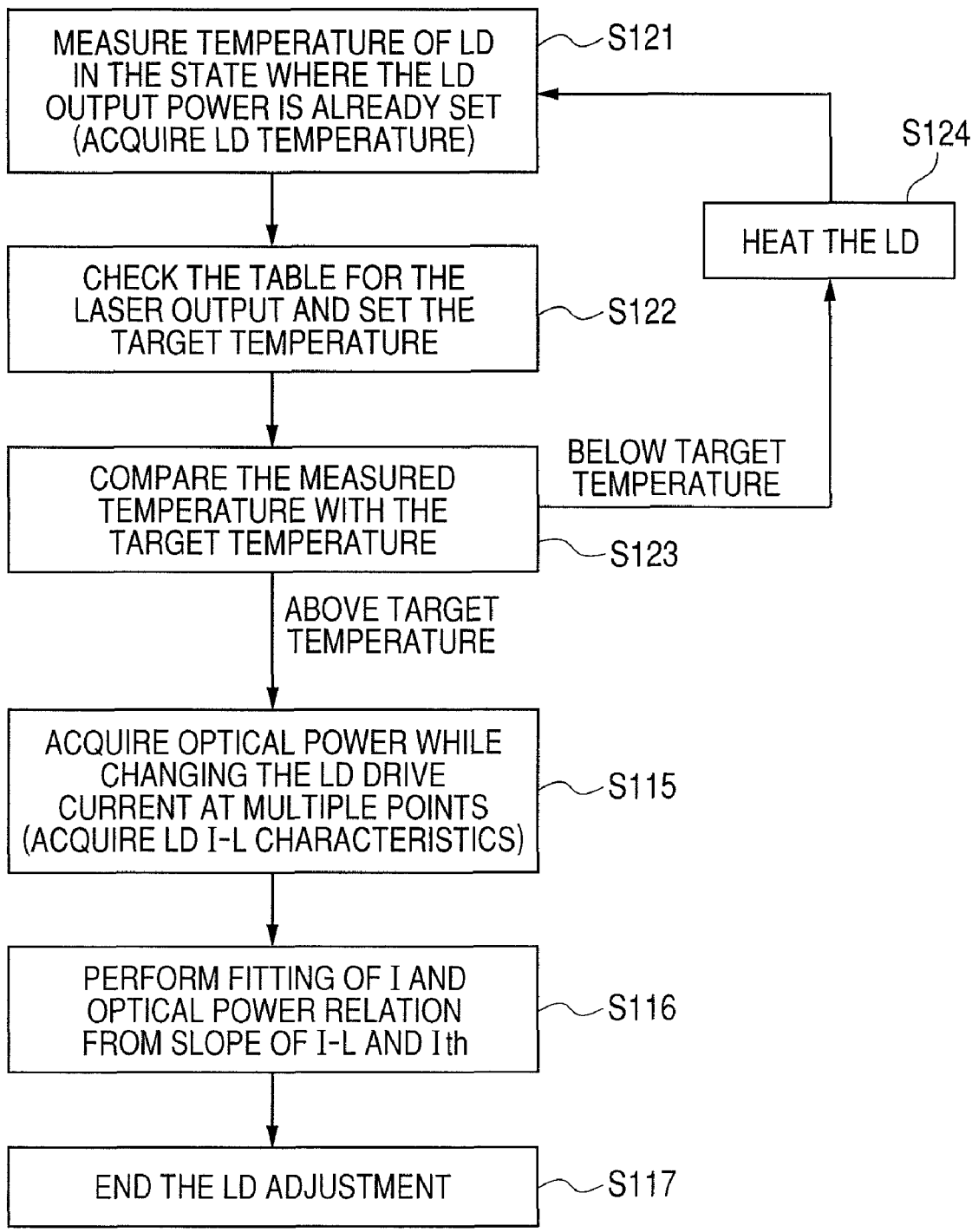
FIG. 14 is a flow sequence chart for showing the LD adjustment flow in the temperature measurement of a second embodiment.
Figure 15:
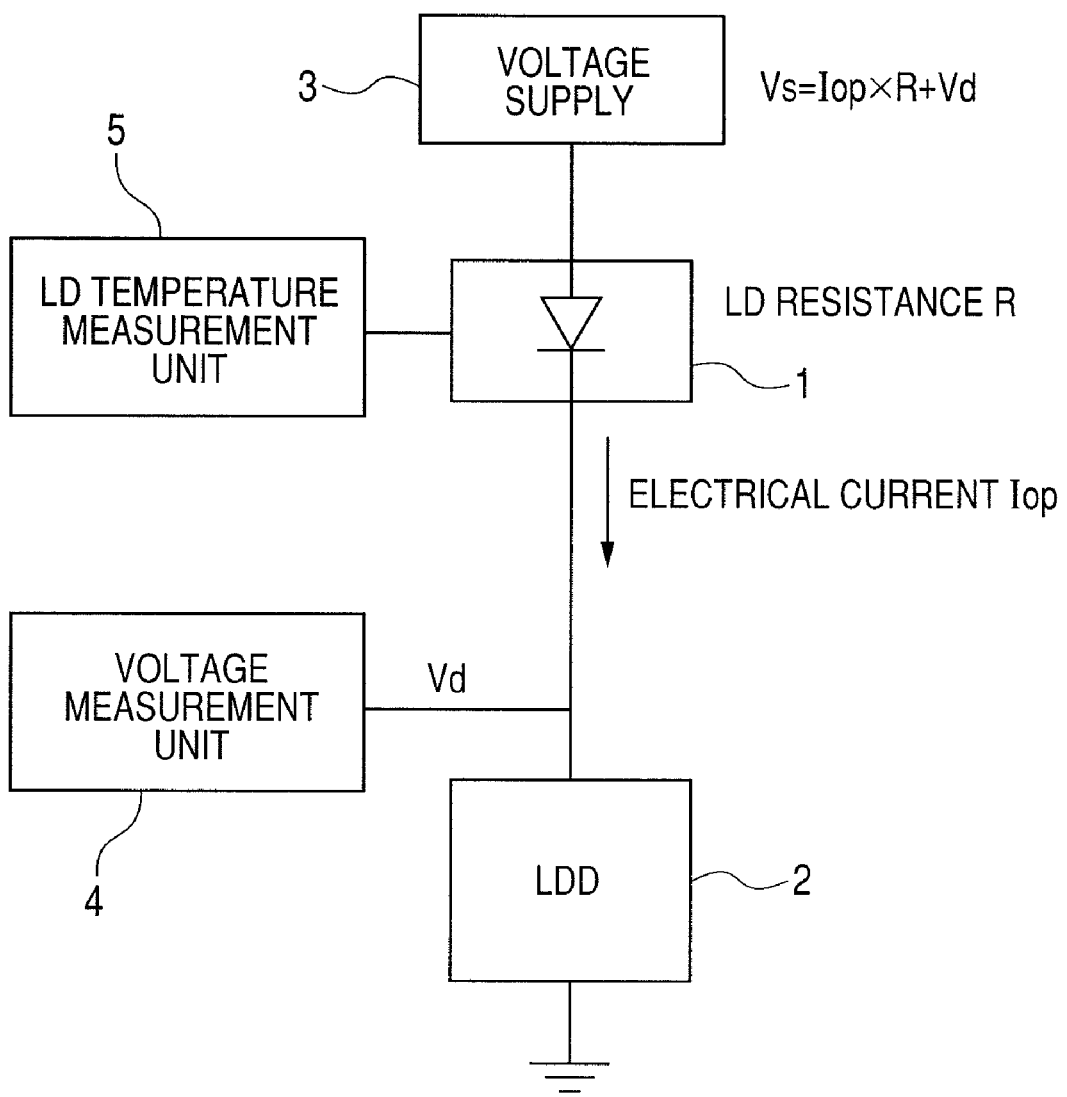
FIG. 15 is a peripheral diagram of the LD and LDD for describing the second embodiment.
Figures 16, 17:
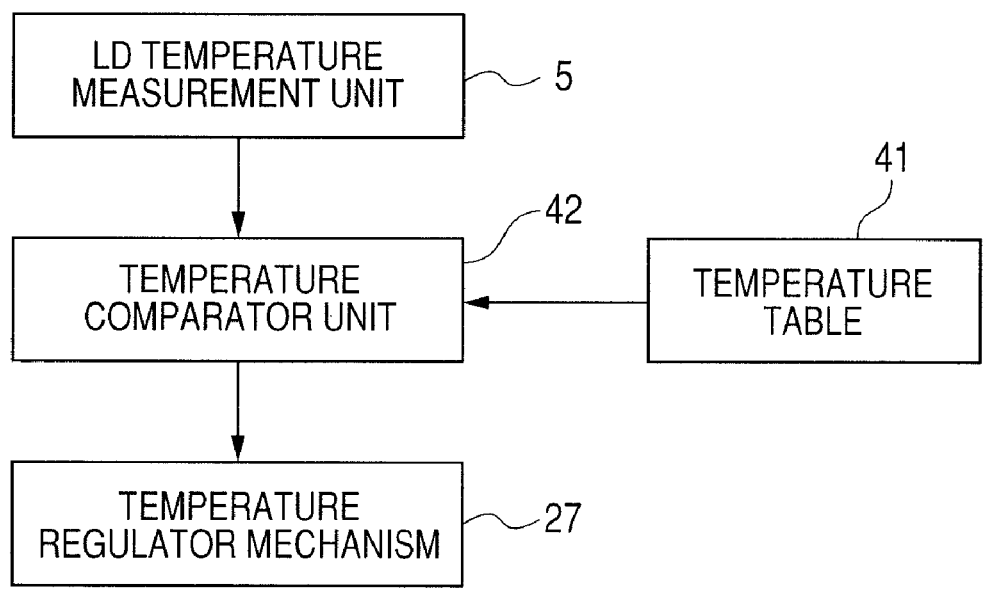
FIG. 16 is a drawing showing the control table for temperature in the second embodiment.
FIG. 17 is a block diagram for implementing the LD adjustment flow sequence of the second embodiment.

The concept view showing the structure in FIG. 9 and the pickup structure of FIG. 10 are approximately identical to the first embodiment. FIG. 15 shows a peripheral diagram of the LD and LDD. This structure includes a LD temperature measurement unit 5 in addition to the structure of FIG. 7. A table such as shown in FIG. 16 is made in advance for LD target temperatures corresponding to the laser power. The second embodiment is described next utilizing the LD adjustment flow sequence shown in FIG. 14.

In step S121, the LD temperature measurement unit 5 measures the temperature of the LD with the LD output power already set to acquire the LD temperature.

In step S122, a target temperature matching the laser output is set while referring to the table in FIG. 16.

In step S123, the comparator unit compares the acquired LD temperature with the target temperature for the LD output power set from the table in FIG. 16.

If the LD temperature is, higher than the target temperature, then the flow sequence proceeds to acquire the LD I-L characteristics in step S115 the same as the flow sequence in the first embodiment.

If the LD temperature is lower than the target temperature, then the temperature regulator mechanism 27 regulates the temperature by heating the LD in step S124 as shown in FIG. 10.

In this embodiment, the steps S121 through S124 are repeated until the LD temperature reaches the target temperature or higher, and after reaching the target temperature or higher the embodiment acquires the I-L characteristics in step S115, performs fitting in step S116, and then ends the LD adjustment (step S117).

FIG. 17 shows a block diagram of the device structure for implementing this LD adjustment flow sequence. The LD temperature measurement unit 5 measures the temperature of the LD light source in a state where the LD output power is already set. A temperature table 41 as shown in FIG. 16, stores the LD target temperatures for the LD output power that was set. A temperature comparator unit 42 compares the temperature of the LD light source measured by the LD temperature measurement unit 5 with the target temperatures in the temperature table 41. If the applicable comparison by the temperature comparator unit 42 shows the LD light source temperature is lower than the target temperature then the temperature regulator mechanism 27 heats the LD light source to set the resistance of the LD light source within a specified resistance.

Third Embodiment

The first and second embodiments lower the power consumption by setting the LD resistance value within a specified value. The third embodiment however sets the LD resistance value while also taking into account the high-frequency (RF) characteristics.

Figure 19:
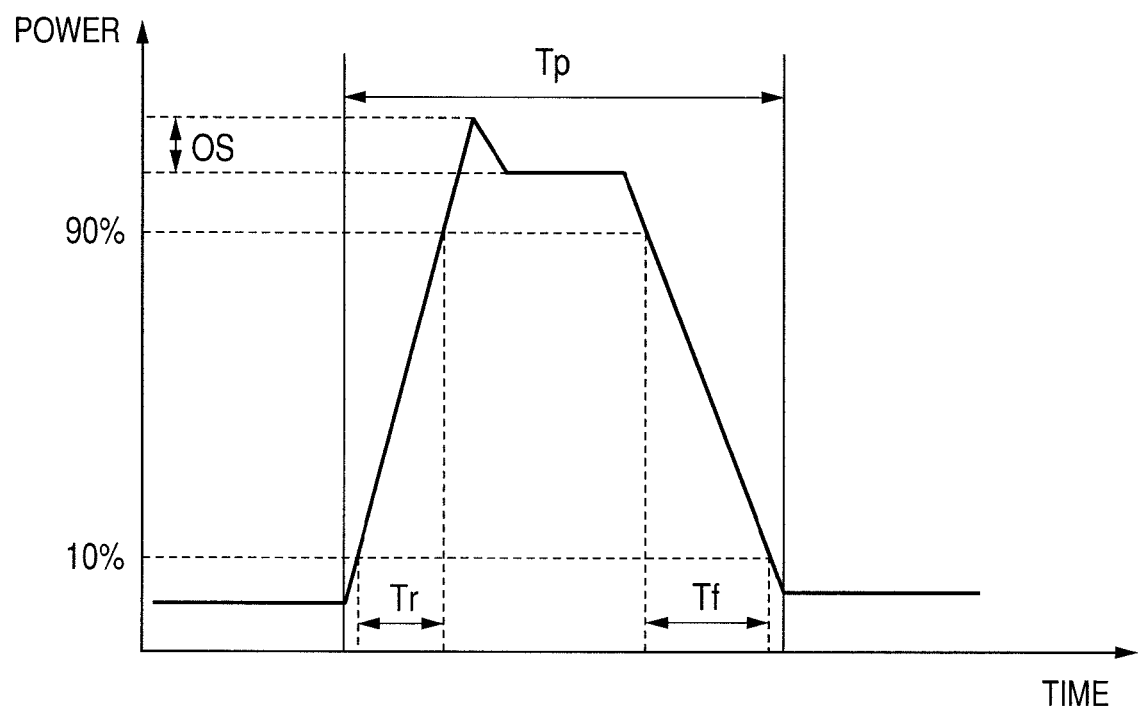
FIG. 19 is a graph for describing the light emission pulse rise time, fall time, and overshoot.
Figure 20A:
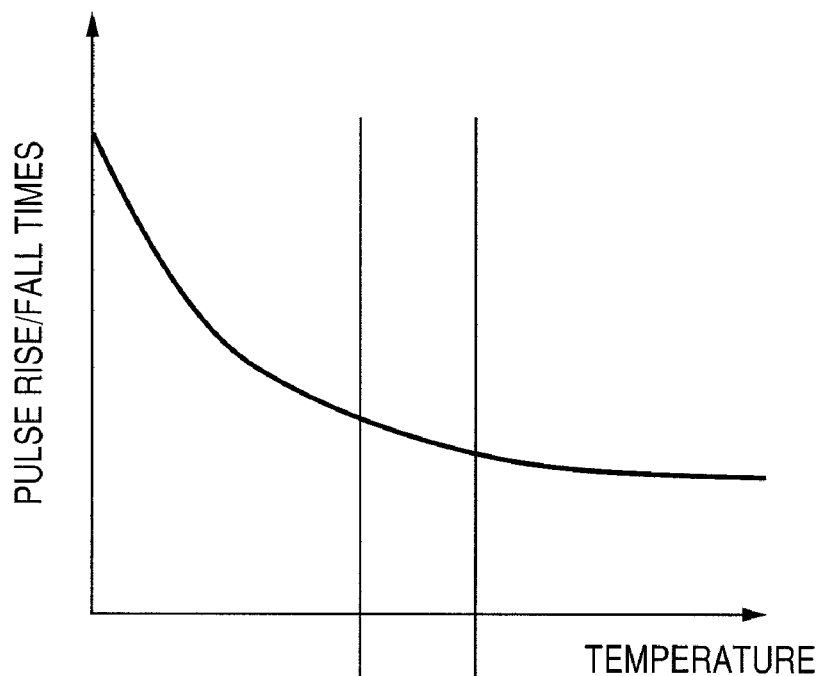
FIG. 20A is graph for showing the light emission pulse rise and fall times versus the temperature.
Figure 20B:
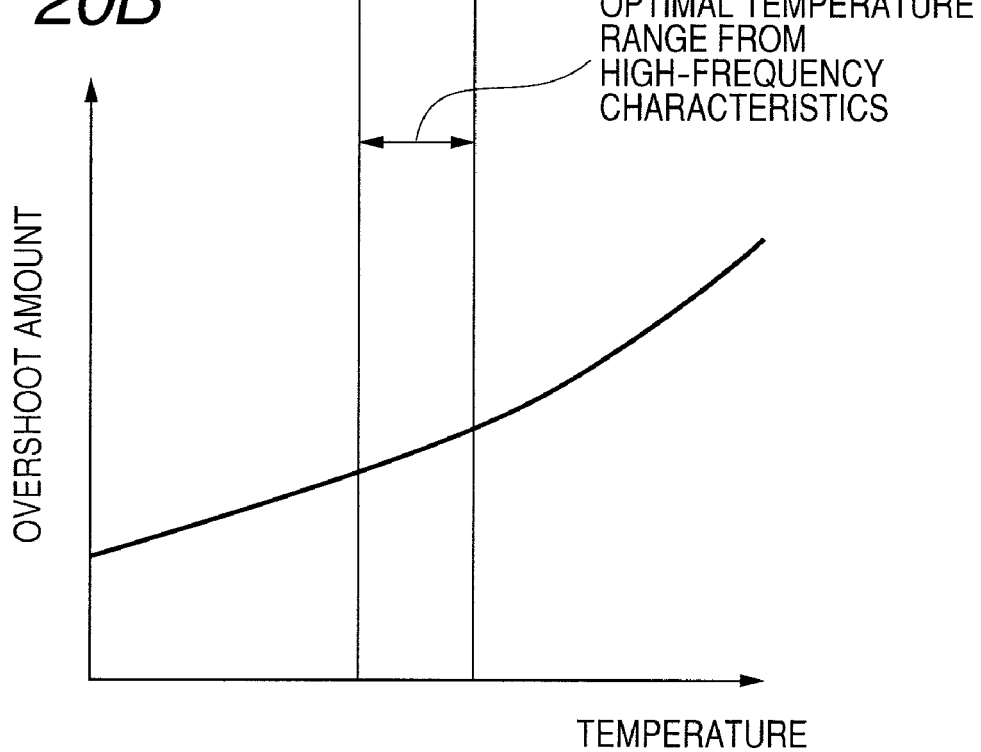
FIG. 20B is a graph for showing fluctuations in the overshoot versus temperature.

The LD and the LD driver are fabricated from semiconductor material and so their characteristics usually fluctuate with the temperature. If utilizing pulses then this temperature characteristic will cause fluctuations in the pulse rise time/pulse fall time and amount of overshoot. FIG. 19 shows the response when rectangular wave pulses were applied and therefore Tr denotes the pulse rise time, Tf denotes the pulse fall time, and OS is the overshoot amount. FIG. 20A shows the relation between pulse rise time/fall time and temperature in which the pulse rise time and fall time decrease along with a rise in temperature. FIG. 20B shows the relation between the overshoot amount and temperature in which the overshoot amount increases along with a rise in temperature. A small pulse rise time/fall time, and a small overshoot amount are generally considered best. This embodiment therefore premeasures the changes in resistance due to temperature fluctuations, and in addition to lowering the power consumption also adjusts the temperature range to an optimum temperature range as shown in FIGS. 20A and 20B while taking into account the high-frequency (RF) characteristics.

Figure 18:
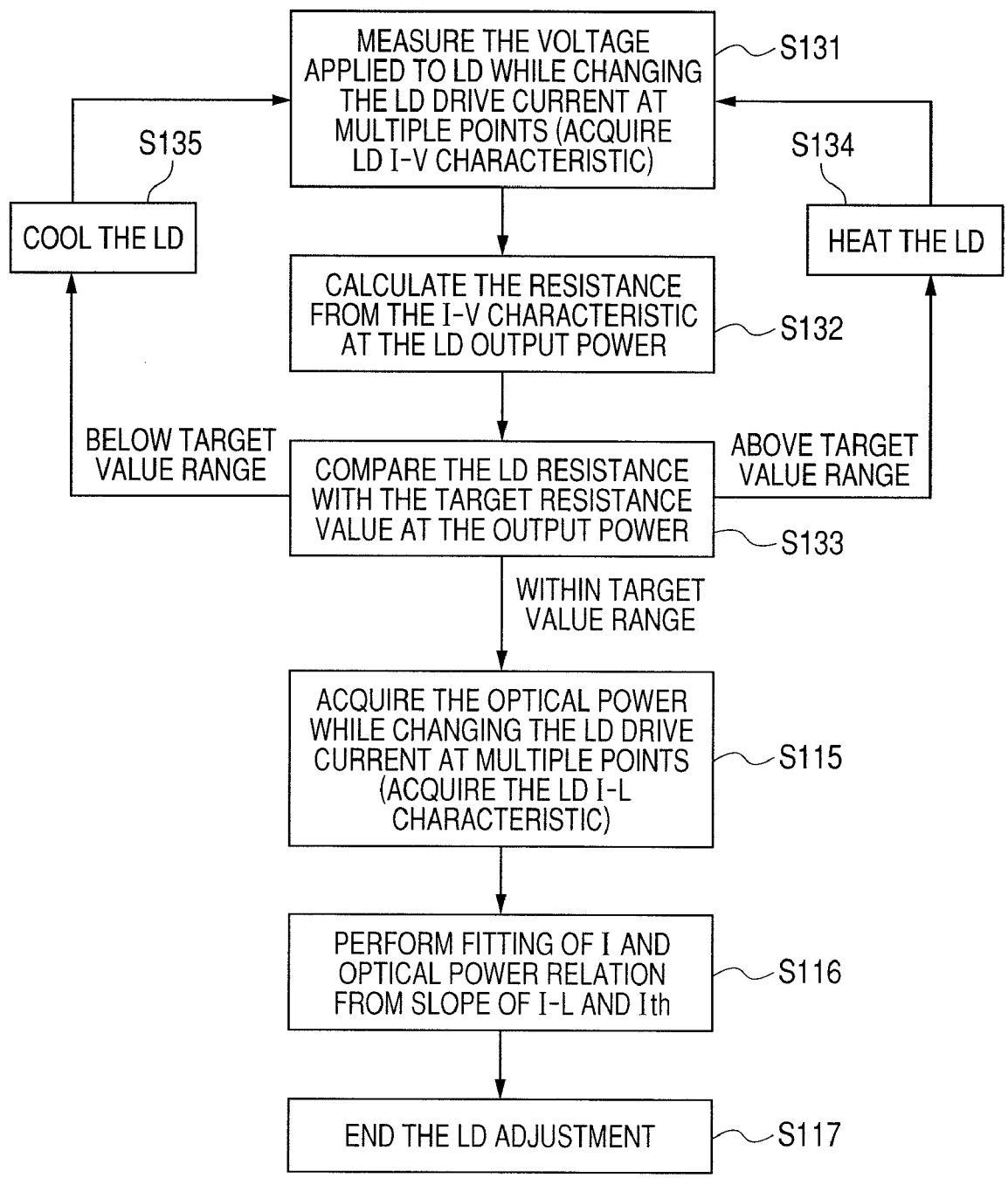
FIG. 18 is a flow chart for showing the LD adjustment flow by setting the resistance range measurement in a third embodiment.

The third embodiment is described next utilizing the LD adjustment flow sequence shown in FIG. 18. In this embodiment, a table showing the target resistance value range of LD resistance corresponding to the laser power is made beforehand as shown in FIG. 21.

In step S131, the voltage applied to the LD is measured while changing the drive current at multiple points to acquire the LD I-V characteristics.

In step S132, the LD resistance at the LD output power is calculated from the I-V characteristics.

In step S133, the calculated LD resistance is compared with the target resistance value range at the LD output acquired from the table in FIG. 21.

If the LD resistance value is within the target value range then the flow sequence proceeds to acquire the LD I-L characteristics in step S115.

If the LD resistance value is higher than the target value range, then the temperature regulator mechanism 27 as described in FIG. 10 applies control in step S134 by heating the LD as described in FIG. 10.

If the LD resistance value is lower than the target value range, then the temperature regulator mechanism 27 as described in FIG. 10 implements control in step S135 by cooling the LD as described in FIG. 10.

Steps S131 through S135 are repeated until the LD resistance value reaches within the target value range, and when within the target value range, the I-L characteristics are acquired in step S115, fitting performed in step S116, and the LD adjustment ends (step S117).

The device structure for implementing this flow sequence is approximately the same as in FIG. 13.

The present embodiment is therefore capable of both lowering power consumption and also optimizing the pulse high-frequency RF characteristics, by adjusting the LD temperature to an optimal temperature range while taking high-frequency characteristics into account as well as lowering the power consumption.

What is claimed is:

1. An optical information recording and reproducing apparatus to record or reproduce information by irradiating pulsed LD (laser diode) light from a LD light source onto an optical information recording medium, the apparatus comprising:
a LD resistance value acquisition unit to acquire information relating to the resistance values of the LD light source in an operating state;
a table to store the target resistance values of the LD light source;
a resistance value comparator unit to compare the LD light source resistance value in the operating state acquired by the LD resistance value acquisition unit with the target resistance value in the table; and
an electrical heating element coupled to the resistance value comparator unit and located relative to the LD light source to heat the LD light source in order to set the resistance of the LD light source in the operating state to a specified value or less when the resistance value of the LD light source from the comparison is higher than the target resistance value.

2. The optical information recording and reproducing apparatus according to claim 1, wherein the LD resistance value acquisition unit measures the voltage of the LD light source while varying the LD drive current and acquires the resistance value from the slope of the voltage-current characteristics.

3. An optical information recording and reproducing apparatus to record or reproduce information by irradiating pulsed LD (laser diode) light from a LD light source onto an optical information recording medium, the apparatus comprising:
a LD temperature measurement unit to measure the temperature of the LD light source in an operating state with the LD output power already set;
a table showing target temperatures corresponding to the LD light source output;
a temperature comparator unit to compare the LD light source temperature measured by the LD temperature measurement unit in the operating state with the target temperature acquired from the table; and
an electrical heating element coupled to the temperature comparator unit and located relative to the LD light source to set the resistance of the LD light source in the operating state to within a specified value by heating the LD light source when the temperature of the LD light source from the comparison is lower than the target temperature.

4. The optical information recording and reproducing apparatus according to claim 3, wherein the LD temperature measurement unit includes a temperature sensor for the LD light source.

5. The optical information recording and reproducing apparatus according to claim 3, wherein the temperature regulator mechanism includes an electrical heating element within the LD light source.

6. The optical information recording and reproducing apparatus according to claim 3, wherein the temperature regulator mechanism includes an electrical heating element outside the LD light source to heat the LD light source.

7. An optical information recording and reproducing apparatus to record or reproduce information by irradiating pulsed LD (laser diode) light from a LD light source onto an optical information recording medium, the apparatus comprising:
a LD resistance value acquisition unit to acquire information relating to the resistance values of the LD light source in an operating state;
a table to store the target resistance values of the LD light source;
a resistance value comparator unit to compare the LD light source resistance value in the operating state acquired by the LD resistance value acquisition unit with the target resistance value in the table;
an electrical heating element coupled to the resistance value comparator unit and located relative to the LD light source to optimize the high-frequency characteristics of the LD light source and also set the LD light source resistance in the operating state to within a specified value by heating the LD light source when the LD light source resistance value is higher than the target resistance value range in the comparison step, and by cooling the LD light source in the operating state when the LD light source resistance value is lower than the target resistance value range in the comparison step.

8. The optical information recording and reproducing apparatus according to claim 7, wherein the LD resistance value acquisition unit measures the voltage of the LD light source while varying the LD drive current and acquires the resistance value from the slope of the voltage-current characteristics.

9. An optical information recording apparatus to record information by irradiating LD (laser diode) light from a LD light source onto an optical information recording medium, the apparatus comprising:
a LD resistance value acquisition unit to acquire information relating to the LD resistance value of the LD light source in an operating state;

a table to store a target resistance value of the LD light source;

an electrical heating element located relative to the LD light source to control a temperature of the LD light source in the operating state to make the LD resistance value not more than the target resistance value stored in the table.

10. The optical information recording and reproducing apparatus according to claim 1, wherein the electrical heating element is located inside the LD light source.

11. The optical information recording and reproducing apparatus according to claim 1, wherein the electrical heating element is located outside of the LD light source.

12. The optical information recording and reproducing apparatus according to claim 3, wherein the electrical heating element is located inside the LD light source.

13. The optical information recording and reproducing apparatus according to claim 3, wherein the electrical heating element is located outside of the LD light source.

14. The optical information recording and reproducing apparatus according to claim 7, wherein the electrical heating element is located inside the LD light source.

15. The optical information recording and reproducing apparatus according to claim 7, wherein the electrical heating element is located outside of the LD light source.

16. The optical information recording and reproducing apparatus according to claim 9, wherein the electrical heating element is located inside the LD light source.

17. The optical information recording and reproducing apparatus according to claim 9, wherein the electrical heating element is located outside of the LD light source.

* * * * *